United States Patent
Pradhan et al.

(10) Patent No.: US 7,370,077 B2
(45) Date of Patent: May 6, 2008

(54) DYNAMIC GENERATION OF A NETWORKED INFORMATION RESOURCE

(75) Inventors: Salil V. Pradhan, Santa Clara, CA (US); John T. Brassil, Los Gatos, CA (US); Peter J. Macer, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

(21) Appl. No.: 09/989,111

(22) Filed: Nov. 21, 2001

(65) Prior Publication Data

US 2003/0097419 A1    May 22, 2003

(51) Int. Cl.
*G06F 15/16* (2006.01)
(52) U.S. Cl. .................... 709/204; 709/227
(58) Field of Classification Search ........ 709/204–206, 709/212, 217, 227; 370/338; 455/416
See application file for complete search history.

(56) References Cited

U.S. PATENT DOCUMENTS

| | | | |
|---|---|---|---|
| 5,852,405 A | 12/1998 | Yoneda et al. | |
| 6,112,206 A | 8/2000 | Morris et al. | |
| 6,166,734 A * | 12/2000 | Nahi et al. | 715/748 |
| 6,449,638 B1 * | 9/2002 | Wecker et al. | 709/217 |
| 6,553,037 B1 * | 4/2003 | Pivowar et al. | 370/463 |
| 6,622,018 B1 * | 9/2003 | Erekson | 455/420 |
| 6,779,153 B1 * | 8/2004 | Kagle | 715/522 |
| 7,057,635 B1 * | 6/2006 | Naden | 348/14.02 |
| 7,152,110 B2 * | 12/2006 | Pierce | 709/227 |
| 7,222,160 B2 * | 5/2007 | Hlasny | 709/217 |
| 2001/0012757 A1 | 8/2001 | Boyle | |
| 2001/0055950 A1 * | 12/2001 | Davies et al. | 455/41 |
| 2002/0107830 A1 * | 8/2002 | Nanja | 707/1 |
| 2002/0132632 A1 * | 9/2002 | Brassil et al. | 455/517 |
| 2002/0146981 A1 * | 10/2002 | Saint-Hilaire et al. | 455/41 |
| 2003/0165128 A1 * | 9/2003 | Sisodia et al. | 370/338 |

FOREIGN PATENT DOCUMENTS

WO    01/69407 A1    9/2001

\* cited by examiner

*Primary Examiner*—William Vaughn
*Assistant Examiner*—Joseph Maniwang

(57) ABSTRACT

A networked information resource generation system includes a wireless network (10), a transceiver (12) and mobile devices (14*a-c*). The mobile devices (14*a-e*) share information over the network (10) via the transceiver (12). The information shared over the network (10) is displayed on the mobile devices (14*a-e*) web-page (71) which is dynamically updated with information from the mobile devices (14*a-e*).

32 Claims, 6 Drawing Sheets

DYNAMIC GENERATION OF A NETWORKED INFORMATION RESOURCE

This invention relates to a method of, and system for the, dynamic generation of a networked information resource. More particularly, but not exclusively the invention relates to a method of, and systems for the, dynamic generation of a personalised web-page.

Current systems for the generation of web-pages require the manual input of data/information in the form of hyper-text mark-up language (HTML). This has the disadvantage that it is not a real time representation of the information content of, for example, a list of people present in a meeting or information required during the meeting. Such information can be posted to a web-page prior to a meeting but any alterations to the information content must be entered manually. Further to which people's responses, or contributions, to information posted on the web-page cannot be readily obtained on the web-page.

It can be seen therefore that current web-page generation systems do not allow for proactive, real-time updating of web-pages to maintain the information thereupon. This has the attendant problem that the information upon a web-page may be out of date when a user comes to access it or may not contain all of the information that is actually available within the network that hosts the web-page. This reduces the web-page's usefulness to potential users.

It is an object of the present invention to provide a method of and systems for, the dynamic generation of a networked information resource that, at least partly, ameliorates one of the above mentioned difficulties/disadvantages.

According to a first aspect of the present invention there is provided a method of generating a networked information resource comprising the steps of:
i) providing first and second network elements;
ii) passing a first data set from the first network element to the second network element over a network via a wireless network connection;
iii) passing a second data set from the second network element to the first network element over the network via a wireless network connection;
iv) collating the information passed between the first and second network elements to form the networked information resource.

In one arrangement steps ii), iii) and iv) may be enacted when the first and second network elements are within network connection range of each other. Most preferably steps ii), iii) and iv) may be enacted automatically when the first and second network elements are within network connection range of each other.

The method may include transmitting a network joining signal by either of the first or second network elements upon entering a network, the joining signal will typically include a network element identifier (ID).

The method may include transmitting an identifier by the other of the first or second network elements in response to receiving the joining signal from the either of the first or second network elements, typically the response includes an ID of the other of the first or second network elements.

The method may include receiving a response at the either of the first or second network elements from the other of the first and second network elements which identifies the other of the first and second network elements to the either of the first and second network elements.

Thus, the information available on the networked information resource is dynamic and updated as network elements enter and leave the network without the need for laborious manual entry of data.

The method may further include the step of broadcasting, or multicasting, data by at least one network element in order to ascertain if there is a network element within connection range typically by requesting each network element receiving the broadcast data responds. The method may further include the step of allowing a network element to join the network and contribute information to the networked information resource as it moves into network connection range. The method may further include the step of removing information relating to a network element from the networked information resource upon said network element moving out of network connection range. The method may further include the step of prompting a user of a network element to store information relating to a network element which is moving out of connection range from the networked information resource or the storing of this information may be effected automatically.

The information passed between the network elements and made available on the networked information resource may typically include electronic business card (V-cards), minutes of meetings, lists of attendees at meetings.

For example, when a person carrying a personal digital assistant (PDA) enters a room which has a network arranged to provide a networked information resource according to the method of the present invention the PDA may automatically contribute the person's details such as their employer, business card and telephone number to the networked information resource. The networked information resource may contain the business cards of every person in the room and this may be stored on the PDA and used for future reference.

The method may include providing the network in the form of short range wireless network. The network may be a Piconet. The method may include providing either or both of the wireless network connections in the form of an infrared connection or a radio frequency connection.

The method may include the step of providing a graphical user interface (GUI) upon at least one of the network elements. The GUI may be a browser. The method may include the step of storing a script for a web-page on at least one of the network elements, the web-page being the networked information resource. The at least one network element may be a server. The script may be written in any one of the following non-exhaustive list: HTML, XML or Java script. The method may further include the step of including the collated information upon the web page. The method may include the step of accessing the web page via the GUI. The web-page may include the aggregate sum of the data passed between the first and second network elements. Thus, web-browsers can be used as a convenient and generic form of representing and sharing the information which is available on the networked information resource.

The method may include providing either, or both, of the first and second network elements in the form of a mobile telecommunications device. Either, or both, of the first and second network elements may be a personal digital assistant (PDA) or a mobile telephone.

The method may include providing at least one of first and second network elements having a long range, e.g. cellular, transceiver therein. The method may further include the step of accessing the networked information resource via a cellular transceiver associated with another network element. This allows devices that have left the short range network to remain connected to and contribute information to the networked information resource.

The method may include the step of providing a third network element. The third network element may be a transceiver. The method may include the step of mediating the passage of data between the first and second network elements through the third network element. The method may include the step of connecting the third network element to either both of the first and/or second network elements via a wireless connection. The method may include accessing the networked information resource via the third network element which forms an access point, in use.

The method may include the step of providing a server. The method may include the step of providing the data on any one of the network elements. The server may be hardwired to the third network element.

The method may include the steps of providing access control, for example an access filter. The method may further comprise the step of restricting the access to data stored on any one of the network elements by any other of the network elements. The filter may allow selective access to some data stored on any one of the network elements by any other of the network elements.

The method may include the step of providing a beacon. The method may include the step of broadcasting a network address associated with the information resource. The network address may be in the form of a URL. The method may further include the step of providing an access point, which may be a transceiver. The method may further include connecting the access point to a server which has the web-page associated with the URL thereupon. The method may include the step of accessing the information resource via the access point by at least one of the network elements. One of the network elements may be the server. This provides for large amounts of data to be readily accessible from a central server. The method may further include updating the data stored on the server. This may be carried out by a user of one of the network elements with appropriate access privileges.

The method may include transmitting any one, or combination, of the following from the beacon: geographical location, purpose, v-card or an advert.

The method may include broadcasting the network address at a second location. The method may further include providing a second access point at the second location. The method may include the step of connecting the second access point to the network address. This allows for information to be shared between two remote groups who may require the same information for example, when videoconferencing.

The method may further include the step of connecting at least one of the first and second network elements to a server. The connecting of the first and second network elements to the server may be via wireless network connections.

According to a second aspect of the present invention there is provided a networked information resource generation system comprising a network, a first network element, and a second network element, the first and second network elements being connectable to the network via wireless network connections characterised in that at least the first network element has a broadcast means adapted to broadcast a signal, and at least the second network element has receiving means, adapted to receive the signal when the at least first network element is within wireless network connection range, and interrogation means, adapted to request information from the at least first network element.

The at least first network element may, in use, provide information to the networked information resource via at least one of the wireless network connections. The information may be provided in response to the request from the at least second information resource, in use.

The networked information resource may be a web page. At least one of the network elements may store a script for the web page. The at least one network element may be a server. The script may be written in any one of the following non-exhaustive list: HTML, XML or Java script.

There may be a graphical user interface (GUI) upon at least one of the network elements. The GUI may be a browser. The web page may be displayed upon the GUI. Web-browsers can be used as a convenient and generic form of representing and sharing the information which is stored on each of the network elements.

Either, or both, of the first and second network elements may be a mobile telecommunications device. Either, or both, of the first and second network elements may be a personal digital assistant (PDA) or a mobile telephone.

The network may be a short-range wireless network. The network may be a Piconet. The wireless network connection may be an infrared connection or a radio frequency connection.

At least one of first and second network elements may have a long range, e.g. cellular, transceiver therein.

There may be a third network element. The third network element may be a transceiver. The third network element may mediate the passage of data between the first and second The third network element may be connected to either or both of the first and/or second network elements via a wireless connection.

Any one of the network elements may be the server. The server may be hardwired to the third network element.

There may be an access filter. The access filter may restrict access to data stored on any one of the network elements by any other of the network elements. The filter may allow selective access to some data stored on any one of the network elements by any other of the network elements.

There may be a beacon. The beacon may, in use, broadcast a network address associated with the networked information resource. The beacon may, in use, broadcast a network address associated with the web page. There may be an access point, which may be a transceiver. The access point may be connected to a server. The server may, in use, store has the web page associated with the network address. The network address may be represented as a universal resource locator (URL).

The web page may be accessed by at least one of the network elements via the access point, in use. One of the network elements may be the server. This provides for large amounts of data to be readily accessible from a central server. The data stored on the server may be updated as a network element enters or leaves the network, in use. A user of one of the network elements with appropriate access privileges may update the web page, in use.

In use, the network address may be broadcast at two discrete locations. There may be a second access point at the second location. The second access point may be connected to the networked information resource. There may be a second beacon at the second location. This allows for information to be shared between two remote groups who may require the same information for example, when videoconferencing.

According to another aspect the invention comprises software encoded on a data carrier which when loaded into a processor of a network element and run on the network element causes the device to be a network element in accordance with any preceding aspect of the invention, or causes the device to take part in, or perform, any method aspect of the invention previously recited.

According to yet another aspect the invention comprises a network element programmed with the software of the preceding aspect of the present invention.

According to still another aspect the invention comprises software encoded on a data carrier which when operational on a server causes the server to be a server in accordance with any preceding server aspect of the present invention, or to perform, or take part in, a method, according to any preceding aspect of the invention.

The invention will now be described, by way of example only, with reference to the accompanying drawings in which.

Figure 1:
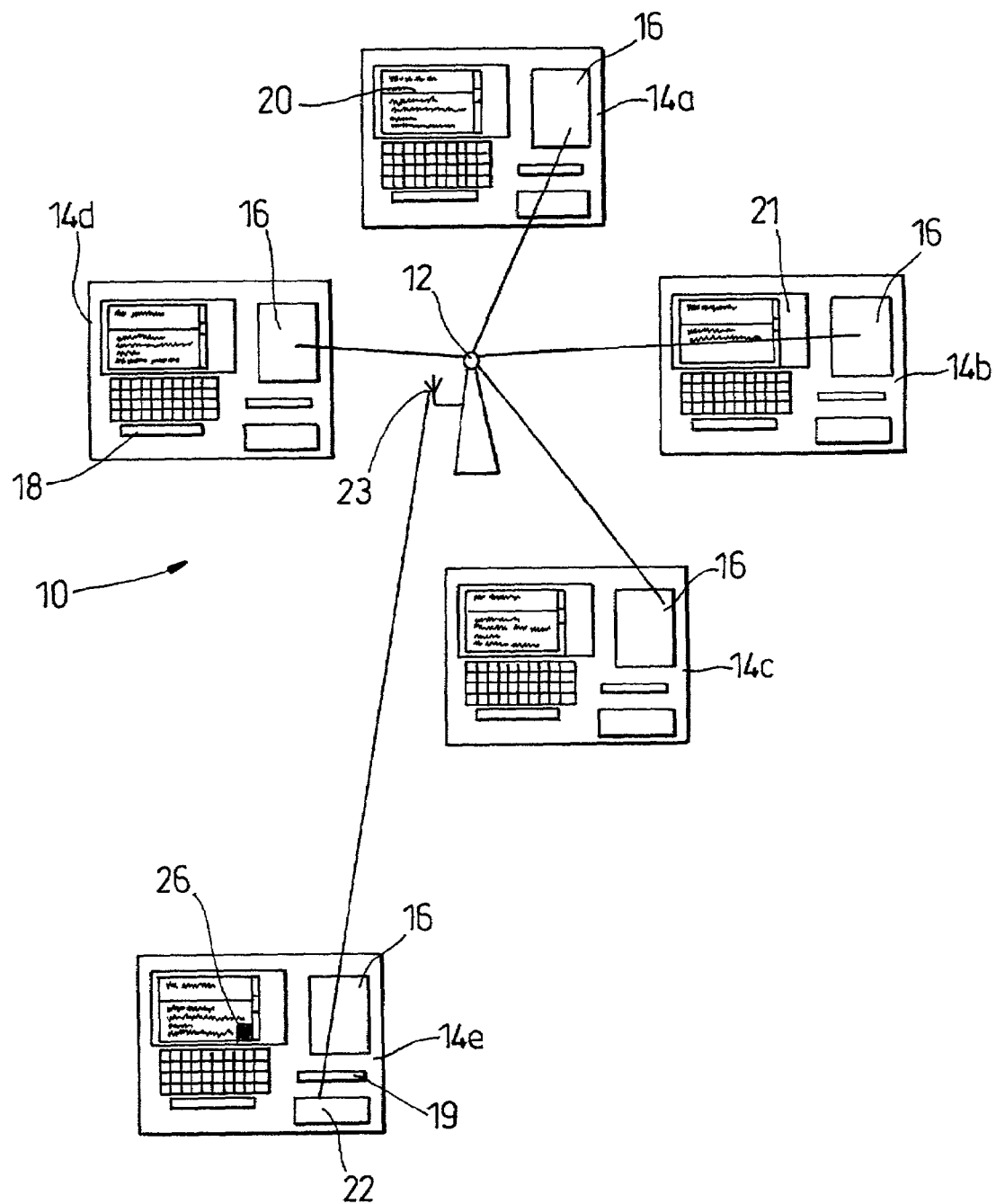
FIG. 1 is a schematic representation of a first embodiment of a networked information resource generation system according to at least one aspect of the present invention.

FIG. 1 shows a wireless network 10, typically a piconet, comprising a transceiver 12 and mobile devices 14a-e.

Each of the mobile devices 14a-e has a transceiver 16, a storage device 18 and a screen 20. The mobile devices 14a-e are typically personal digital assistants (PDA) and will be referred to as PDA's hereinafter, but could be mobile telephones, laptop computers or any other suitable portable device. The transceiver 16 is typically an infra-red or a radio transceiver or alternatively it could be any suitable radiative transceiver.

The transceiver 16 intermittently transmits an identification signal. Upon receipt of the identification signal the transceiver 12 sends a signal requesting data to the PDA 14a-d via the transceiver 16. Data stored on the storage device 18 of one of the mobile devices 14a is transmitted to the transceiver 12 via the mobile devices transceiver 16. The transceiver 12 broadcasts the data within the network 10. Each of the mobile devices 14a-d within the network 10 receives the data via their respective transceivers 16.

Each of the PDA's 14a-d runs software 19 that provides a graphical user interface (GUI) 20 on the respective screens 21. The GUI 20 is used to display the information.

Each of the PDA's 14a-d pushes information 10 the transceiver 12 over the network 10. The transceiver 12 does not contain a large amount of memory, it only has a buffer memory to store data which is in transit over the network 10.

The information on each of the PDA's 14a-d exists locally in their memories and/or storage devices 16. However, what is displayed on each of the PDA's 14a-d is an aggregate of the sum of the information. The information is typically booking schedules for meeting rooms, minutes of meetings, e-business cards, suggestions of topics of discussion in a meeting etc., but could relate to facilities available for meetings such as rooms, projection facilities. Generation of such an aggregate page is not a complex operation—one logical approach would be for each PDA to hold a template for the "aggregate page" with the different elements of the template completed by data received from other PDAs, but other approaches are entirely possible. It should also be noted that while such an arrangement is particularly appropriate to business meeting information, this is far from the only application for aspects of the invention (which need not be limited to business meetings, meetings as such, or specific locations).

The PDA 14e is shown outside the network 10. It is envisaged that a device such as this PDA 14e will be able to contribute data to the aggregated information by the use of a cellular telephone type transceiver 22 in the PDA 14e to connect the network 10 via a cellular transceiver 23 associated with the network transceiver 12.

Upon entering the network 10 the PDA 14e starts communicating with the transceiver 12 and contributes its data to the aggregate data over the network 10. This is because the short range, for example Piconet, data transfer protocols such as Bluetooth and IEEE 802.11 are far more efficient and have higher data transfer rates than current cellular data transfer protocols.

When one of the PDA's, for example PDA 14e having entered the network 10, leaves the network 10 it is possible to still display the information associated with the PDA 14e if the PDA 14e maintains a long distance cellular telephonic link to the network 10 via the transceiver 23. Alternatively, one of the other PDA's, for example PDA 14b, may store the information from PDA 14e and retransmit it over the network 10.

There may be privileges, access controls, associated with the data which restrict who can access the data. For example, the owner of PDA 14c wishes to deny access to their data to the owner of PDA 14b so configures their access controls to prevent the PDA 14b from accessing the data. This is shown in FIG. 1 by the lack of information on the screen 20 of PDA 14b relating to the secretary of the meeting. Alternatively, there could be time restrictions placed upon the access of documents such that documents could only be accessed for a limited period of time, for example for the expected duration of a meeting. This could require the chair of a meeting to have to access alter the privileges if the meeting were to overrun.

Figure 2:
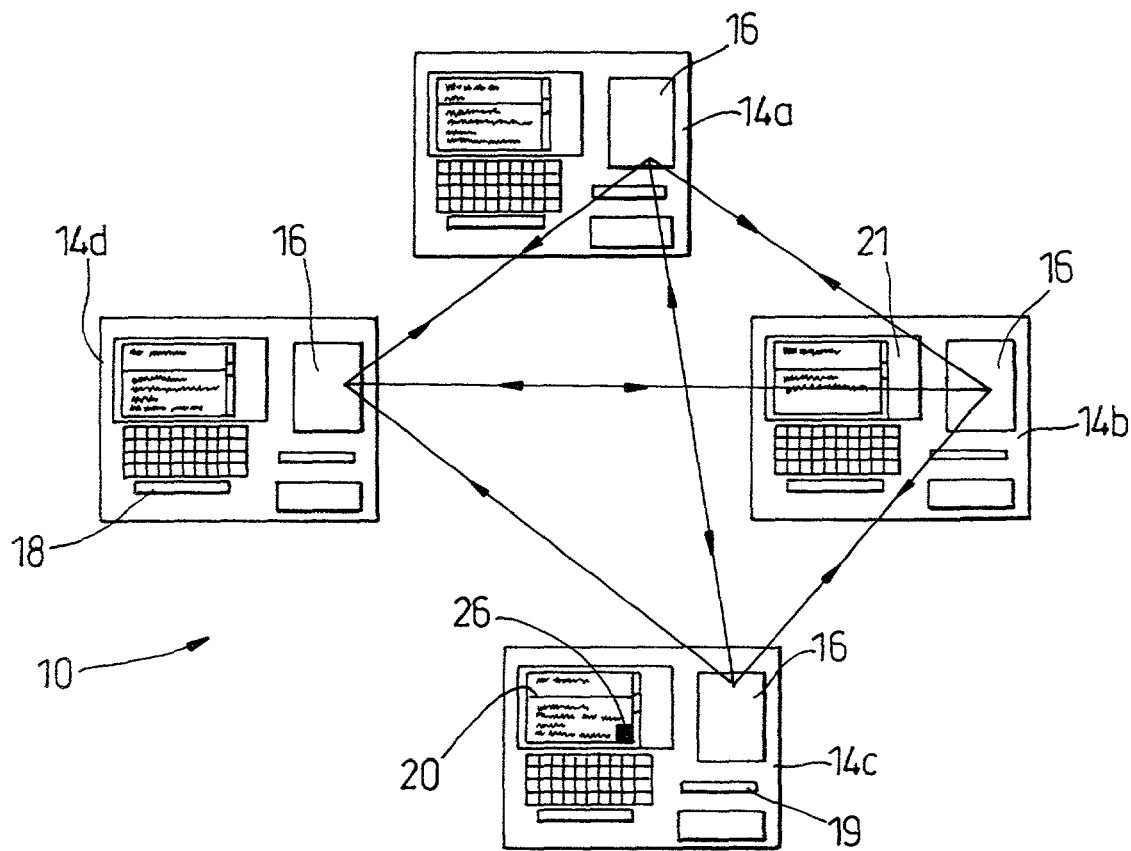
FIG. 2 is a schematic representation of a second embodiment of a networked information resource generation system according to at least one aspect of the present invention.
Figure 2:
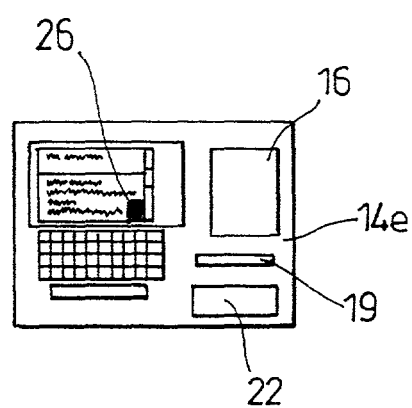

In an alternative embodiment, shown in FIG. 2, the PDA's 14a-d communicate directly between themselves via their respective transceivers 16 to form a Piconet which is dynamic as the PDA's 14a-d move into and out of communication range of each other.

The transceiver 16, for example of PDA 14a, intermittently transmits an identification signal. Upon receipt of the identification signal the PDA 14b sends a signal requesting data to the PDA 14a. The PDA's 14a-d push information between each other and the current aggregate information is displayed on the screen of each PDA 14a-e.

In a modification to either of the above embodiments a prompt 26 to save information appears on the screen 20 of the PDA 14a-e. This prompt may appear either when a PDA enters the network or when a PDA leaves the network. Alternatively, the prompt may appear at regular time intervals.

In a modification to the either of the abovementioned embodiment the PDA's 14a-d within the Piconet interrogate each other to ascertain which of them, if any, have sufficient available memory to act as a server and store the aggregated information thereupon.

Figure 3:
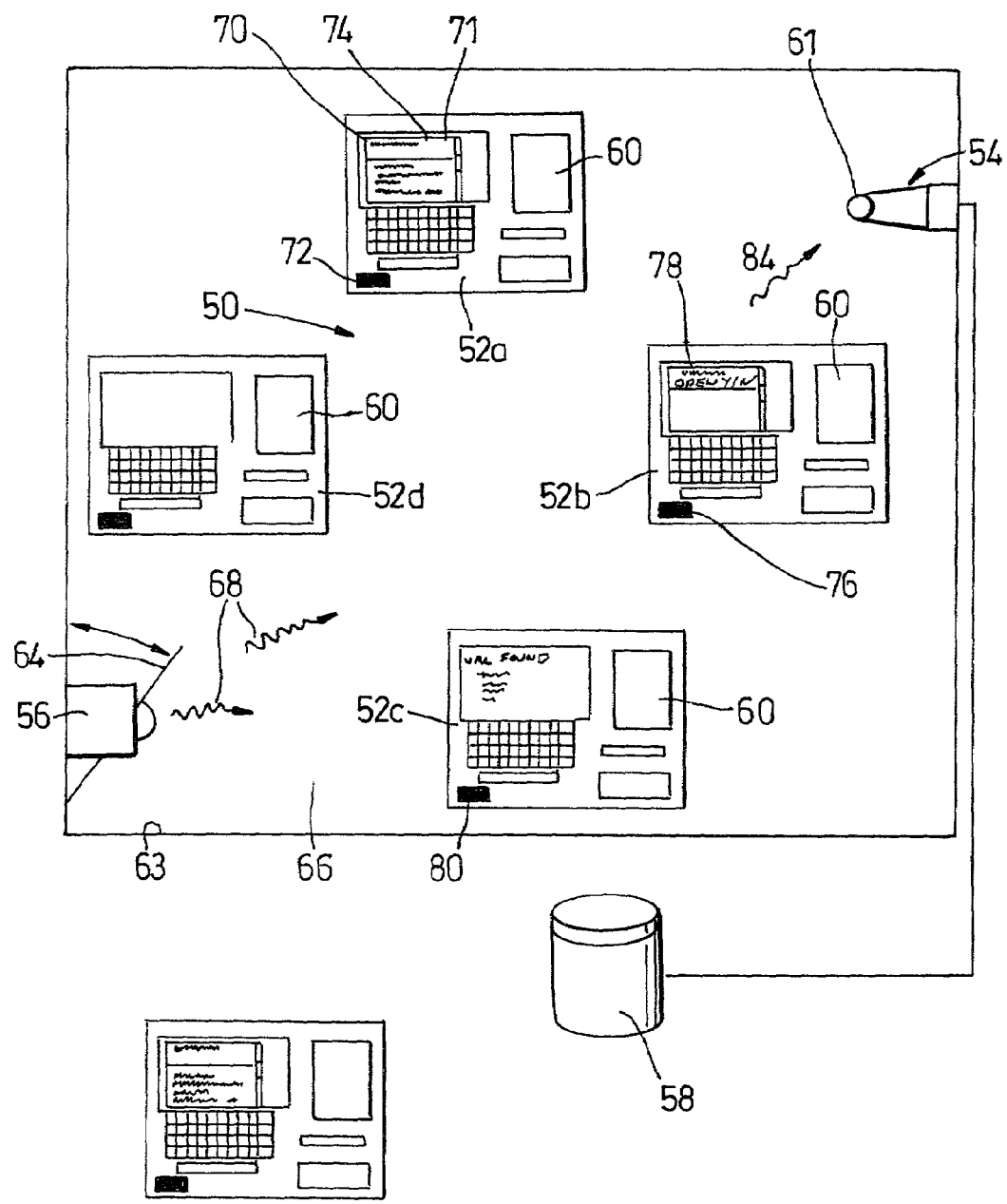
FIG. 3 is a schematic representation of a third embodiment of a networked information resource generation system according to at least one aspect of the present invention.

In a yet further embodiment of the present invention, shown in FIG. 3, a network 50 comprises a plurality of PDA's 52a-d substantially similar to those of the first embodiment, an access point 54, a beacon 56 and a server 58.

Each of the PDA's 52a-d has a short range transceiver 60 mounted therein. The transceiver 60 is typically an infra-red transceiver, a radio frequency transceiver or any suitable type of radiative transceiver.

The transceiver 60 intermittently transmits an identification signal. Upon receipt of the identification signal the access point 54 sends a signal requesting data to the PDA 52a-d via the transceiver 16. The data is received by the access pint 54 and placed on the server 58.

The access point 54 and the server 58 are connected to each other. The access point 54 has a short range, typically of the order of 10 m, transceiver 61 that allows access to data stored on the server 58 to be accessed via a wireless network such as, for example, a Piconet.

The beacon 56 is typically mounted on a wall 63 or a door frame 64 of a room 66 and emits a short range, typically of the order of a few tens of metres, omnidirectional signal 68. The signal 68 carries a repeating broadcast of a universal resource locator (URL) 70 corresponding to a web page 71 which is with an event happening in the location or the location itself. The hypertext mark up language (HTML) script associated with web page 71 is stored on the server 58. The script associated with the web page 71 need not be in the form of HTML but may be Java, XML or any other suitable language.

The PDA 52a has an application 72 running thereupon that, upon receiving the signal 68, automatically opens a generic browser 74 and loads the URL 70 into the application 72. The PDA 52b has an application 76 running thereupon that, upon receiving the signal 68, produces a prompt 78 informing the user of the existence of the URL 70 and asks the user if they wish to open the URL 70 within the browser 74. If user indicates, either by a keystroke or any other positive confirmation, that they wish to open the web-page associated with the URL 70 the application opens the web page associated with the URL. The PDA 52c has an application 80 running thereupon that, upon receiving the signal 68, produces a prompt 82 that informs the user of the existence of the URL 70. The user of the PDA 52c must open the browser 74 and enter the URL 70 into the browser 74 themselves in order to access the web page 71. The PDA 52d does not inform the user that the signal 68 has been received and the user must obtain knowledge of the URL 70 from another source, for example, another user in the room or from minutes of the meeting.

In a modification of the previous embodiment attendees of meetings in the room 66 can 'sign in' upon entering the room. The PDA's 52a-d may automatically send a signal 84 containing the attendees personal details when the signal 68 is received. The attendees personal details typically include name, employer, position in the meeting. The server 58 then adds this name to the list of attendees in real time. As a person leaves the meeting their PDA can sign them out of the meeting again in a dynamic, real time manner.

In another modification to the previous embodiment the chair of the meeting, for example the user of PDA 52a has access privileges to allow them to access the HTML script and change the information contained on the web page 71. This allows the chair of a meeting to maintain up to date information relating to the ongoing meeting. Other attendees of the meeting may, or may not, be allowed to access the web page 71 and alter the contents of the web page 71.

Figure 4:
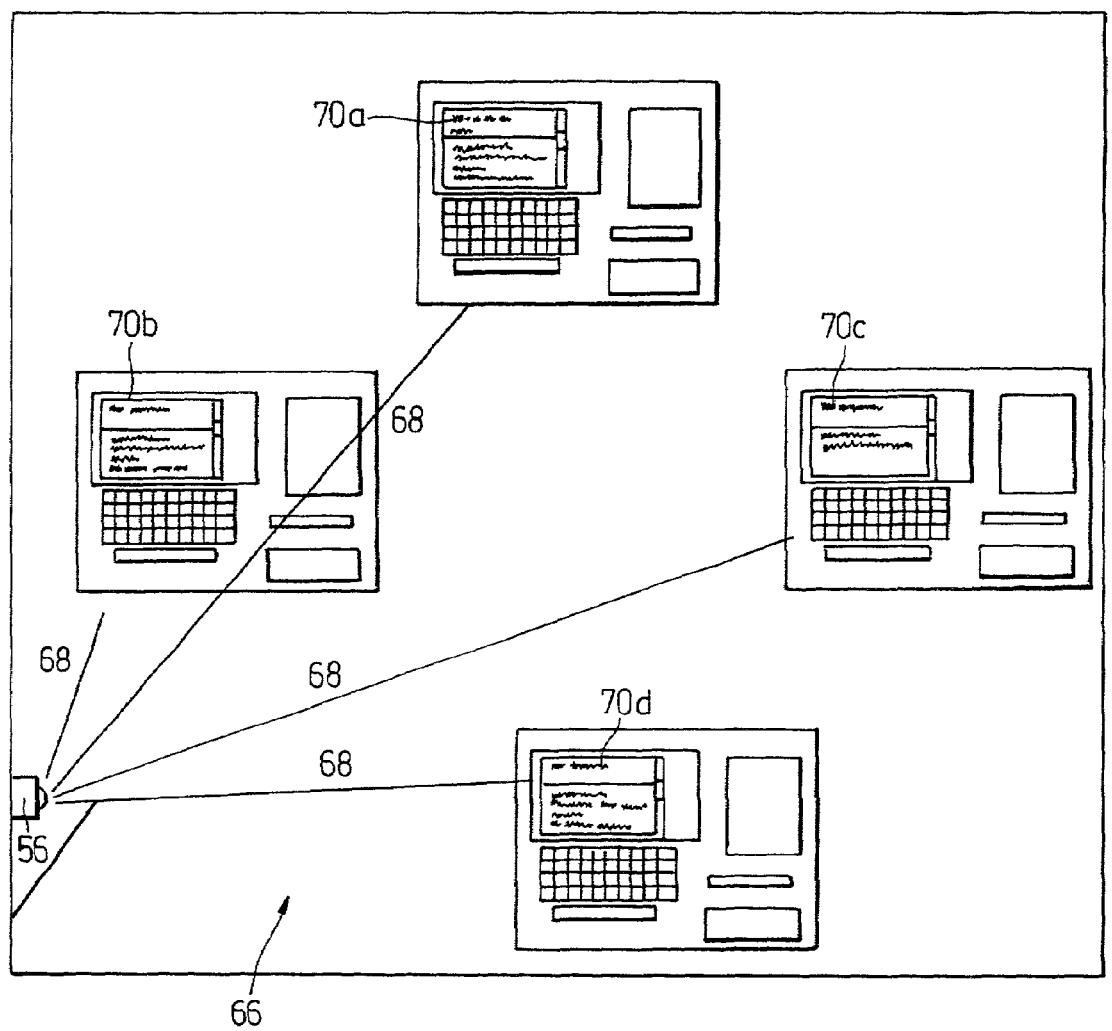
FIG. 4 is a schematic representation of a modification of the system of FIG. 3.
Figure 4:
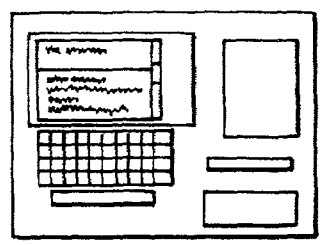

The web page 71 may also include a booking list that gives details of who has booked the room 66 for meetings, who is expected to be attending the meetings. The beacon 56 may, in some embodiments, as shown in FIG. 4 broadcast multiple URLs 70a-d relating to multiple meetings that are due to take place in the room 66. The PDA's 52a-d can be configured to only display those URLs which relate to meetings that their users are expected to attend.

In a further modification of the previous embodiment there is dialogue between the server 58 and the PDA's 52a-d that details which documents on the web page 71 that are required for the meeting that is scheduled to take place in the room 66 at any given time. This dialogue results in the automatic maintenance of the web page with the correct documents for any given meeting.

Figure 5:
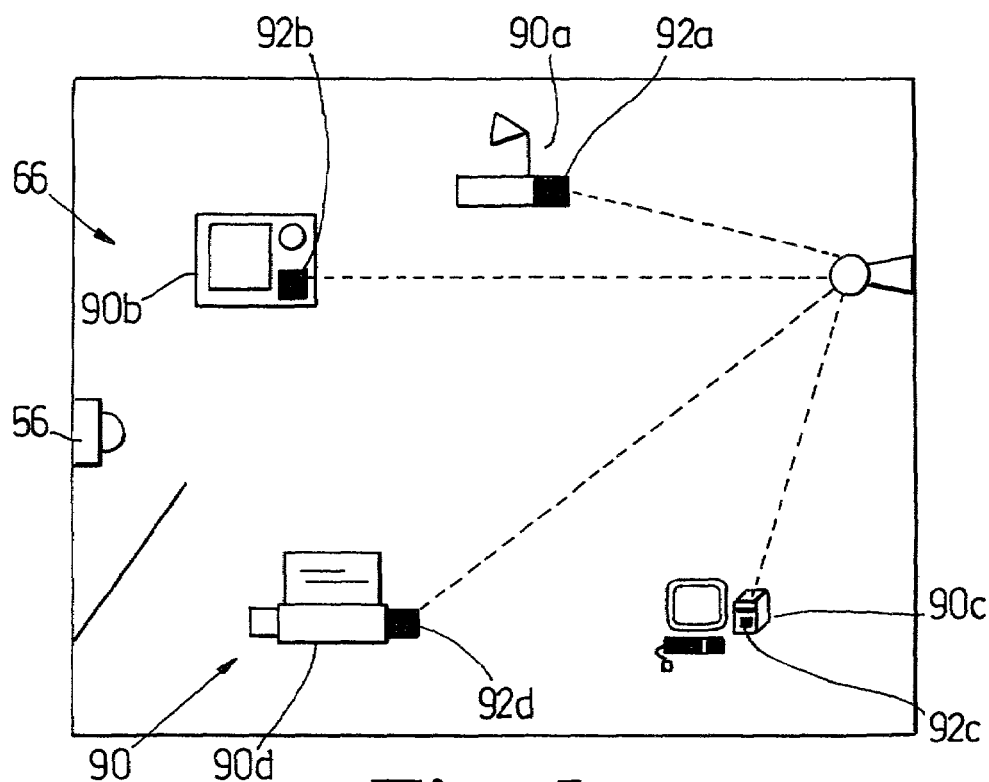
FIG. 5 is a schematic representation of a further modification of the system of FIG. 3.

The web page 71 associated with the URL 70 typically contains building infrastructure information associated with the room 66 such as the location of amenities, for example toilets, beverage facilities, fire fighting equipment and presentation/projection equipment provided. In particular, as shown in FIG. 5, portable amenities 90 such a projectors 90a, a television 90b, a computer 90c, or a printer 90d may have respective short-range transceivers 92a-d therein. The transceivers 92a-d are linked to the server 58 via a wireless connection to the access point 54. If one of these portable amenities 90 is removed from the room 66 the link between the access point 54 and the transceiver 92a-d will be broken and the server's 58 list of available amenities will be updated to reflect this and the web page 71 for altered accordingly, in real time.

Figure 6:
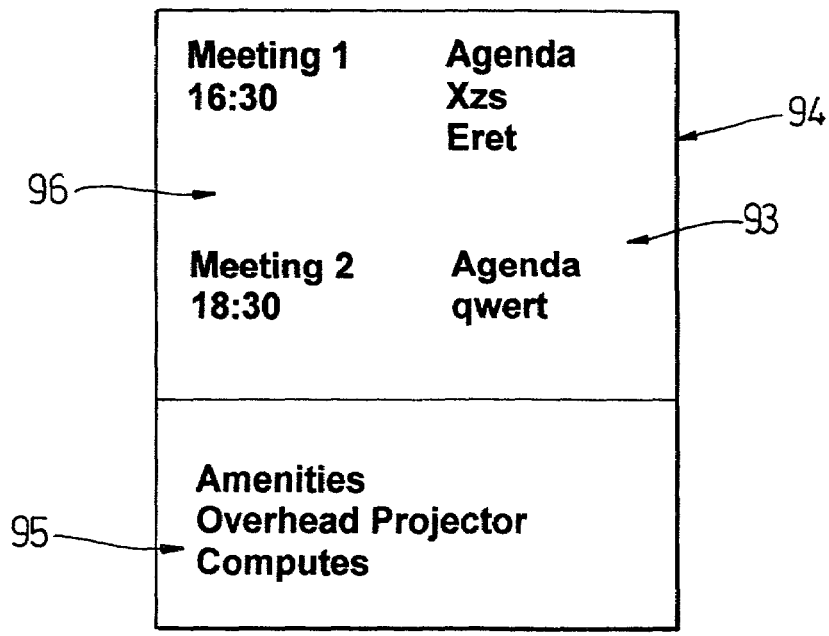
FIG. 6 is a representation of a room booking list generated by the system of FIG. 3.

The information as to who is present in a meeting, the available amenities in a meeting room, the booking schedule and the agenda of meetings may be presented on a display 93 on a screen 94 outside a meeting room 66, as shown in FIG. 6.

This display 93 has a first portion 95 which relates to the amenities present in the room 66 and a second portion 96 which gives details of the booking schedule and agenda of meetings. The first portion 95 will not alterable be users, for example, the chair of the meeting, whereas the second portion 96 will be user alterable to reflect changes in booking schedules and agenda of meetings.

Figure 7:
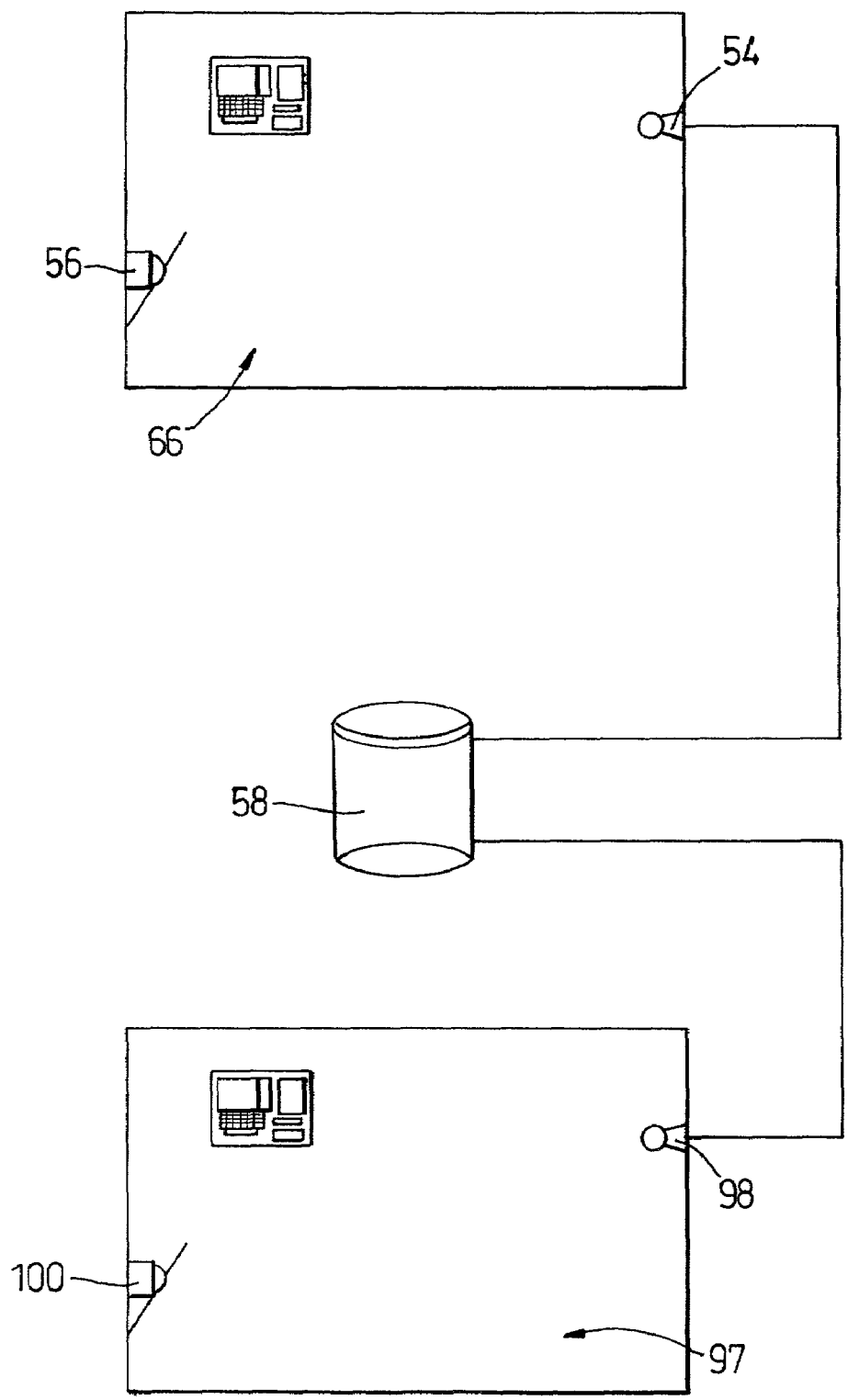
FIG. 7 is a schematic representation of a yet further modification of the system of FIG. 3.

FIG. 7 shows, a further modification to the present embodiment wherein a second room 97 is provided with an access point 98 and a beacon 100. The access point 98 is connected to the server 58 so as to share information dynamically between the occupants of the two rooms 66, 97.

The connection between the access point 98 and the server 58 may be a Piconet bridge, a LAN, a WAN, the Internet, a public switched telephone network (PSTN) or a cellular telephone link. This arrangement allows the sharing of information between rooms 66, 97 which are geographically close, for example in the same building over a LAN, or geographically distant, for example on a different continent over the PSTN.

There is typically a two way transfer of information and documents between the PDA's and the server with the PDA's uploading documents to the server and the server downloading documents to the PDA's.

It will further be appreciated that the wireless network arrangements in any of the embodiments described hereinbefore may utilise either of the Bluetooth or IEE 802.11 data transfer protocols or any other suitable data transfer protocol.

The wireless network may be a Piconet or a wireless LAN network there may be additional functionality provided by provision of cellular communication between the wireless network elements. It will be appreciated that any of the modifications to any of the embodiments are mutually exchangeable between embodiments, where applicable.

The invention claimed is:

1. A method of generating and distributing a dynamically updated web page through use of first and second network elements communicating over a short range wireless network, comprising the steps of:
   (i) passing a first data set from the first network element to the second network element over the short range wireless network via a short range wireless network connection;
   (ii) passing a second data set from the second network element to the first network element over the short range wireless network via a short range wireless network connection;
   (iii) aggregating the first and second data sets; and
   (iv) forming a dynamically updated web page to represent the information included in both the first and second data sets by responding to the aggregated first and second data sets as passed over the short range data network via the short range wireless network connections, the short range wireless network connections having a range that is shorter than cellular data transfer protocols and a higher data transfer rate than cellular data transfer protocols;
   the method being performed while a meeting is conducted among plural participants, the meeting being conducted with the aid of the short range wireless network including a plurality of the short range wireless network elements, the elements having a memory, each of the participants being associated with one of the network elements, the network element associated with each participant storing in the memory thereof personal information about the associated participant, the method further comprising:
   (v) in response to a first participant entering the meeting, causing a first of the network elements to transmit via the short range wireless network the personal information about the first participant to a device of the network, the device including a memory storing the web page,
   (vi) storing the personal information about the first participant that was transmitted via the network from the first element to the device in the device memory so the personal information about the first participant is on the web page;
   (vii) in response to a second participant entering the meeting, causing a second of the network elements to transmit via the short range wireless network the personal information about the second participant to the device of the network,
   (viii) storing the personal information about the second participant that was transmitted via the network from the first element to the device so the personal information about the second participant is on the web page and so that the device memory stores and the web page includes the personal information of the first and second participants; and
   (ix) causing the device memory to distribute at least some of the personal information of the first and second participants on the web page to network elements of participants of the meeting via a link including the short range wireless network.

2. The method of claim 1, further including the steps of polling by at least the first network element; ascertaining that there is a network element within the short range wireless network connection range by responding to the polling; and causing said ascertained network element (a) to connect to the short range wireless network and (b) contribute information to the networked information resource as it connects to the short range wireless network.

3. The method of claim 1, further comprising the step of routing the passage of data between the first and second network elements through a third network element of the short range wireless network.

4. The method of claim 3, further comprising accessing the networked information resource via the third network element, which forms an access point between the short range wireless network and another network.

5. The method of claim 1, further comprising restricting access to some or all of the data stored on any one of the network elements of the short range wireless network to receipt thereof by another of the network elements of the short range wireless network, the access being restricted based on the nature of the restricted data vis-à-vis a security rating of the another network element.

6. The method of claim 1, further comprising the step of repeatedly broadcasting a network address associated with the web page from a beacon at a first location, the beacon having a range that is shorter than that of cellular data transfer protocol.

7. The method of claim 6, further comprising the step of repeatedly broadcasting the network address via a second beacon at a second location, the second location being an access point connected to the network address and to a network different from the short range wireless network, the second location access point transferring information between the network address and the different network.

8. The method of claim 1, wherein at least one of the first and second network elements is in the form of a mobile telecommunications device.

9. The method of claim 1, wherein at least one of the first and second network elements includes a long-range cellular transceiver that communicates the dynamically updated web page to a cellular network.

10. The method of claim 1, further comprising the step of accessing the networked information resource via a cellular transceiver associated with another network element.

11. The method of claim 1 further including the step of the first element sending a sign out signal via the short range wireless network to the device memory in response to the first participant leaving the meeting.

12. The method of claim 1 wherein the first and second network elements are mobile devices that can be carried by one hand of the first and second participants, and the transmitting steps for the personal information about the first and second participants are performed by transmissions from the mobile devices in response to the first and second participants entering an area where the meeting is being held as a result of the mobile devices of the first and second network elements being carried by the first and second participants into the meeting area.

13. The method of claim 1 wherein the device is one of the network elements.

14. The method of claim 1 wherein the device is a network server that differs from a network element of a participant.

15. The method of claim 1 wherein one of the participants alters the information stored in the device memory and on the web page by activating the network element associated with said one participant, transmitting the alteration from the network element associated with said one participant to the device memory via a link including the short range wireless network, and causing (a) the device memory to store the transmitted alteration and (b) the transmitted alteration to modify the web page.

16. The method of claim 1 wherein a plurality of the participants after the information stored in the device memory and on the web page by activating the network element associated with said one participant, transmitting the alteration from the network element associated with said one participant to the device memory via a link including the short range wireless network, and causing (a) the device memory to store the transmitted alteration and (b) the transmitted alteration to modify the web page.

17. The method of claim 1 wherein the network includes more than two of said elements that transmit the personal information about the participants directly to each other.

18. A web page generation and distribution system for use in connection with a meeting in a meeting space, the meeting being conducted among plural participants, comprising a short range wireless network, a first network element, and a second network element, the first and second network elements being adapted to be coupled to the short range wireless network via short range wireless network couplings such that at least the first network element has a short range wireless transmitter for short range wirelessly broadcasting a signal including a first data set, the second network element having a short range transceiver for short range wirelessly transmitting to the first network element another signal including a second data set and for wirelessly receiving the signal including the first data set only in response to the first network element being within short range wireless network coupling range, and a processor programmed to request information from the first network element and for aggregating the first and second data sets, as transmitted via the short range wireless network, to form a web page that is dynamically updated to represent the information included in both the first and second data sets, the short range wireless network couplings having (a) a range sufficient to cover the meeting space and that is shorter than cellular data transfer protocols and (b) a higher data transfer rate than cellular data transfer protocols; each of the elements having a memory, each of the participants being associated with one of the network elements, the network element associated with each participant being arranged for storing in the memory thereof personal information about the associated participant, the system being arranged so that (a) in response to a first participant entering the meeting, a first of the network elements is arranged to transmit via the short range wireless network the personal information about the first participant to a device of the network, the device including a memory for storing the web page, the device being arranged for storing, in the device memory, the personal information about the first participant that was transmitted via the network from the first element to the device so the personal information about the first participant is on the web page; (b) in response to a second participant entering the meeting, a second of the network elements is arranged to transmit via the short range wireless network the personal information about the second participant to the device of the network, the device being arranged for storing, in the device memory, the personal information about the second participant that was transmitted via the network from the first element to the device for causing (i) the personal information about the second participant to be on the web page and (ii) the device memory to store the web page to include the personal information of the first and second participants; (c) causing the device memory to distribute at least some of the personal information of the first and second participants on the web page to network elements of participants of the meeting via a link including the short range wireless network.

19. The system of claim 18, wherein the at least first network element is arranged to provide information to the processor via at least one of the wireless network couplings.

20. The system of claim 19, wherein the information is provided in response to a request from the at least second network element.

21. The system of claim 18, wherein at feast one of the first and second network elements is a mobile telecommunications device.

22. The system of claim 18, wherein further including a third network element including a transceiver.

23. The system of claim 22, wherein the third network element is arranged to mediate the passage of the information between the first and second network elements.

24. The system of claim 18, further including a server arranged for storing script for the web page.

25. The system of claim 24, wherein at least one of the network elements acts as the server.

26. The system of claim 18, further including a beacon for repeatedly broadcasting a network address associated with the networked information resource at a first location.

27. The system of claim 26, wherein a second beacon is arranged to repeatedly broadcast the network address at a second location, and a second access point is arranged to couple a signal including the dynamically updated web page data to the network address corresponding to the networked information resource.

28. The system of claim 18, further including an access point from which the networked information resource can be accessed.

29. The system of claim 28, wherein the system comprises a server and wherein the access point is arranged to couple a signal including web page data to the server.

30. The system of claim 18, further including an access filter for restricting access to data stored on any one of the network elements by any other of the short range network elements.

31. A method of generating and distributing a dynamically updated web page by using plural network elements communicating over a short range wireless network having (a) connections between the plural network elements with a range that is shorter than cellular data transfer protocols and (b) a higher data transfer rate between the plural network elements than cellular data transfer protocols, the method comprising the steps of:
  passing, via the short range wireless network, a first data set with information about something associated with a first network element of the plural network elements, the first data set being passed from the first network element to other network elements of the plural network elements;
  passing, via the short range wireless network, a second data set with information about something associated with a second network element of the plural network elements, the second data set being passed from the second network element to further network elements of the plural network elements, one of the further network elements being the first network element and one of the other network elements being the second network element;
  aggregating the first and second data sets;
  forming a dynamically updated web page having information about something associated with the first network element and something associated with the second network element included in both the first and second data sets by responding to the aggregated first and second data sets as passed over the short range data network; and distributing, via the short range wireless network, the updated web page to network elements of the short range wireless network.

32. A system for generating and distributing a dynamically updated web page comprising:

a short range wireless network including plural network elements and (a) connections between the plural network elements with a range that is shorter than cellular data transfer protocols and (b) a higher data transfer rate between the plural network elements than cellular data transfer protocols;

the system, in operation:

(a) passing, via the short range wireless network, a first data set with information about something associated with a first network element of the plural network elements, and causing the first data set to be passed from the first network element to other network elements of the plural network elements;

(b) passing, via the short range wireless network, a second data set with information about something associated with a second network element of the plural network elements, and causing the second data set to be passed from the second network element to further network elements of the plural network elements, one of the further network elements being the first network element and one of the other network elements being the second network element;

(c) aggregating the first and second data sets;

(d) forming a dynamically updated web page having the information about something associated with the first network element and something associated with the second network element included in both the first and second data sets by responding to the aggregated first and second data sets as passed over the short range data network; and (e) distributing, via the short range wireless network, the updated web page to network elements of the short range wireless network.

\* \* \* \* \*

UNITED STATES PATENT AND TRADEMARK OFFICE
CERTIFICATE OF CORRECTION

PATENT NO. : 7,370,077 B2
APPLICATION NO. : 09/989111
DATED : May 6, 2008
INVENTOR(S) : Salil V. Pradhan et al.

It is certified that error appears in the above-identified patent and that said Letters Patent is hereby corrected as shown below:

In column 11, line 5, in Claim 16, delete "after" and insert -- alter --, therefor.

In column 11, line 44, in Claim 18, after "participant" insert -- , --.

In column 12, line 9, in Claim 21, delete "feast" and insert -- least --, therefor.

Signed and Sealed this

Fifth Day of August, 2008

JON W. DUDAS
*Director of the United States Patent and Trademark Office*